(12) United States Patent
Han

(10) Patent No.: US 12,496,488 B2
(45) Date of Patent: Dec. 16, 2025

(54) EASY-TO-ADJUST EXERCISE DEVICE

(71) Applicant: Jianliang Han, Zhejiang (CN)

(72) Inventor: Jianliang Han, Zhejiang (CN)

( * ) Notice: Subject to any disclaimer, the term of this patent is extended or adjusted under 35 U.S.C. 154(b) by 80 days.

(21) Appl. No.: 18/669,482

(22) Filed: May 20, 2024

(65) Prior Publication Data

US 2025/0352845 A1    Nov. 20, 2025

(51) Int. Cl.
*A63B 21/00*      (2006.01)
*A63B 21/075*     (2006.01)

(52) U.S. Cl.
CPC ........ *A63B 21/4035* (2015.10); *A63B 21/075* (2013.01)

(58) Field of Classification Search
CPC ... A63B 21/074; A63B 21/4035; F16B 7/042; F16B 9/07; F16B 21/02
See application file for complete search history.

(56) References Cited

U.S. PATENT DOCUMENTS

| | | | | |
|---|---|---|---|---|
| 12,280,287 | B1* | 4/2025 | Chen | A63B 21/075 |
| 12,287,000 | B1* | 4/2025 | Wang | F16B 7/044 |
| 2022/0193480 | A1* | 6/2022 | Wu | A63B 21/075 |
| 2022/0362618 | A1* | 11/2022 | Chuang | A63B 21/0605 |
| 2023/0330472 | A1* | 10/2023 | Zhang | A63B 21/0728 |
| 2025/0152993 | A1* | 5/2025 | Qi | A63B 21/0557 |

* cited by examiner

*Primary Examiner* — Joshua Lee
(74) *Attorney, Agent, or Firm* — Hawaii Patent Services; Nathaniel K. Fedde; Kenton N. Fedde

(57) ABSTRACT

An easy-to-adjust connecting assembly comprises a locking piece and a connecting piece. The connecting piece is provided with a protruding portion and a receiving portion. A movable tooth button is arranged in the receiving portion, an elastic element is arranged between the movable tooth button and the receiving portion, and the movable tooth button is elastically arranged in the receiving portion by the elastic element and comprises a fixing tooth. The locking piece is provided with a receiving slot, the connecting piece is rotatably arranged in the receiving slot, limit teeth and a limit groove are arranged in the receiving slot, and the limit groove has an open end and a closed end, the limit teeth are able to mesh with the fixing tooth, and the protruding portion is rotatably arranged in the limit groove via the open end.

20 Claims, 21 Drawing Sheets

EASY-TO-ADJUST EXERCISE DEVICE

TECHNICAL FIELD

The invention relates to the technical field of fitness equipment, in particular to an easy-to-adjust exercise device.

BACKGROUND

At present, exercise devices, such as dumbbells, kettlebells and ropeless jump ropes, are common body-building tools used by people. These exercise devices are generally used together with weights, and users can adjust the weight of the weights according to their own condition to do exercise. However, existing exercise devices and weights are generally fixed together by hold-down nuts, which increase the operation complexity of weight changing and prolonging the preparation time when users use the exercise devices for exercising; and after long-term use, the nuts may become loose, leading to falling of the weights.

U.S. patent application Ser. No. 18/097,446 discloses a convenient weight-adjustable dumbbell. Each weight of the dumbbell is provided with a slot and a lock. When the weight needs to be adjusted, one weight is mounted on the other weight by the slot and is fixed by the lock, such that the weights are connected in a stacked manner. Although the weights fixed by the locks can be prevented from falling, the weights have to be detached or mounted one by one when the weight needs to be decreased or increased, so users cannot adjust the weight of the weights quickly.

In view of the above problems, a novel exercise device, which ensures that weights can be firmly mounted and unlikely to fall and allows users to adjust the weight of the weights quickly.

SUMMARY

The invention provides an easy-to-adjust connecting assembly, comprising a locking piece and a connecting piece, wherein:
- the connecting piece is provided with a protruding portion and a receiving portion, a movable tooth button is arranged in the receiving portion, an elastic element is arranged between the movable tooth button and the receiving portion, and the movable tooth button is elastically arranged in the receiving portion by the elastic element and comprises a fixing tooth; and
- the locking piece is provided with a receiving slot, the connecting piece is rotatably arranged in the receiving slot, limit teeth and a limit groove are arranged in the receiving slot, the limit groove has an open end and a closed end, the limit teeth are able to mesh with the fixing tooth, and the protruding portion is rotatably arranged in the limit groove via the open end; and
- where, the movable tooth button has a convex state and a concave state under the action of the elastic element; in the convex state, the limit teeth mesh with the fixing tooth, the protruding portion is located in the limit groove and is only allowed to rotate towards the closed and, and when rotating to the closed end, the protruding portion is limited by the closed end to be prevented from further rotating; and
- in the concave state, the fixing tooth is separated from the limit teeth, and the protruding portion is allowed to rotate towards the open end to leave the limit groove.

The invention further provides an easy-to-adjust exercise device, comprising a weight and a grip portion, wherein:
- the grip portion is connected with a connecting piece, the connecting piece is provided with a protruding portion and a receiving portion, a movable tooth button is arranged in the receiving portion, an elastic element is arranged between the movable tooth button and the receiving portion, and the movable tooth button is elastically arranged in the receiving portion by the elastic portion and comprises a fixing tooth; and
- the weight is provided with a receiving slot, the grip portion is rotatably arranged in the receiving slot, limit teeth and a limit groove are arranged in the receiving slot, the limit groove has an open end and a closed end, the limit teeth are able to mesh with the fixing tooth, and the protruding portion is rotatably arranged in the limit groove via the open end; and
- wherein, the movable tooth button has a convex state and a concave state under the action of the elastic element; in the convex state, the limit teeth mesh with the fixing tooth, the protruding portion is located in the limit groove and is only allowed to rotate towards the closed and, and when rotating to the closed end, the protruding portion is limited by the closed end to be prevented from further rotating; and
- in the concave state, the fixing tooth is separated from the limit teeth, and the protruding portion is allowed to rotate towards the open end to leave the limit groove.

The invention further provides a body-building method, using an easy-to-adjust exercise device, the exercise device comprising multiple weights and a grip portion, wherein:
- the grip portion is provided with connecting pieces, the connecting piece is provided with a protruding portion and a receiving portion, a movable tooth button is arranged in the receiving portion, an elastic element is arranged between the movable tooth button and the receiving portion, and the movable tooth button is elastically arranged in the receiving portion by the elastic portion and comprises a fixing tooth; and
- the weight is provided with a receiving slot, the grip portion is rotatably arranged in the receiving slot, limit teeth and a limit groove are arranged in the receiving slot, the limit groove has an open end and a closed end, the limit teeth are able to mesh with the fixing tooth, and the protruding portion is rotatably arranged in the limit groove via the open end; and
- wherein, the movable tooth button has a convex state and a concave state under the action of the elastic element; in the convex state, the limit teeth mesh with the fixing tooth, the protruding portion is located in the limit groove and is only allowed to rotate towards the closed and, and when rotating to the closed end, the protruding portion is limited by the closed end to be prevented from further rotating;
- in the concave state, the fixing tooth is separated from the limit teeth, and the protruding portion is allowed to rotate towards the open end to leave the limit groove; and
- the body-building method comprises:
- selecting the suitable weight, and placing the grip portion in the receiving slot; and
- rotating the grip portion to allow the movable tooth button and the protruding portion to engage with the limit teeth and limit groove respectively to fix the grip portion in the receiving slot; and
- doing exercise with the exercise device.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
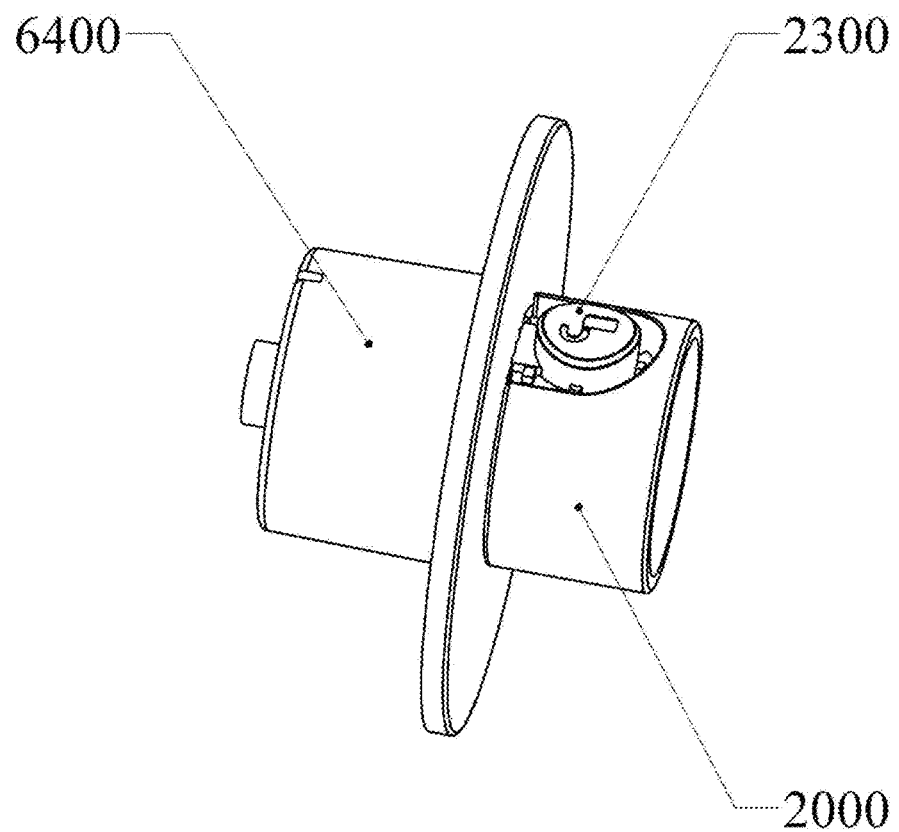
FIG. 1 is a schematic diagram of a connecting assembly according to the invention.

(1000) grip portion; (1100) connecting rod; (1200) mating portion; (1300) mating rabbet; (2000) connecting piece; (2100) protruding portion; (2200) receiving portion; (2300) movable tooth button; (2310) fixing tooth; (2400) fixing portion; (2500) clamping hole; (2600) fixing piece; (3000) elastic element; (4000) button shell; (5000) lifting portion; (5100) fixing plate; (6000) weight; (6100) shell; (6110) cavity; (6111) sliding groove; (6200) bottom cover; (6300) weight block; (6310) sliding portion; (6320) socket; (6400) locking piece; (6410) connecting portion; (6420) receiving slot; (6430) limit tooth; (6440) limit groove; (6441) open end; (6442) closed end; (6450) connecting hole; (6460) abutting piece; (6470) through-hole; (6480) rope; (7000) support member.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the invention, to ensure that weights can be firmly mounted and unlikely to fall and users can adjust the weight of the weights quickly, the invention provides an easy-to-adjust exercise device.

Referring to FIG. 1, the exercise device realizes quick disassembly and assembly of a weight by a connecting assembly. Wherein, the connecting assembly comprises a locking piece 6400 and a connecting piece 2000. The exercise device comprises at least one weight 6000 and a grip portion 1000, wherein the locking piece 6400 is arranged in the weight 6000, and the connecting piece 2000 is arranged in the grip portion 1000.

Referring to FIG. 1-FIG. 5, the grip portion 1000 is connected with the connecting piece 2000 and provided with a connecting rod 1100, the connecting piece 2000 is configured as a hollow structure, and the grip portion 1000 penetrates into the connecting piece 2000. The connecting pieces 2000 are detachably disposed around two ends of the connecting rod 1100.

Figure 5:
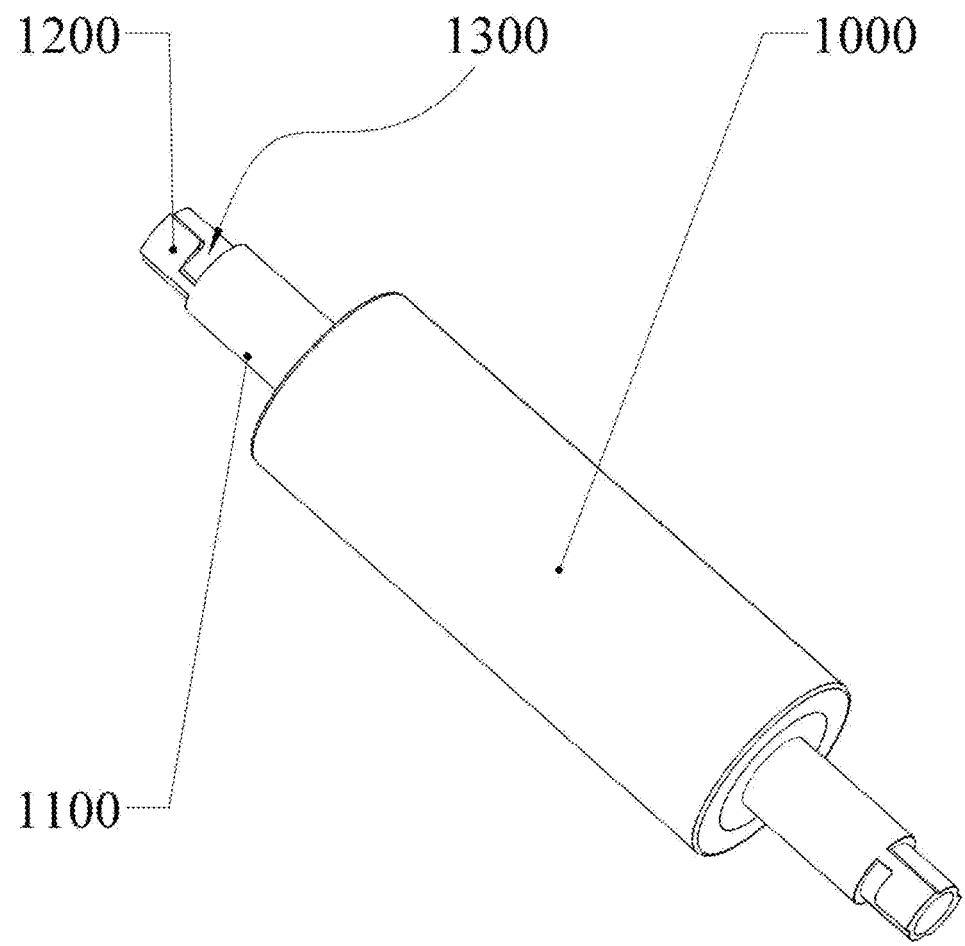
FIG. 5 is a schematic diagram of a connecting rod according to the invention.
Figure 6:
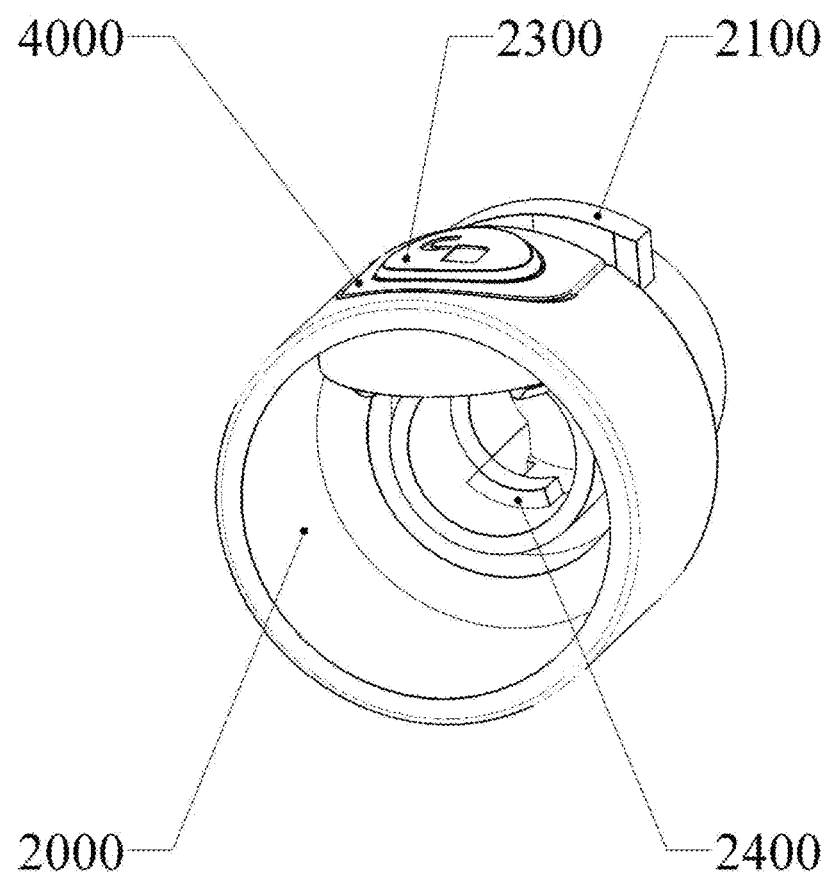
FIG. 6 is a schematic diagram of a connecting piece according to the invention.

Specifically, referring to FIG. 5 and FIG. 6, mating portions 1200 are arranged at the two ends of the connecting rod 1100, mating portions 1200 are fixedly arranged on the mating portions 1200, and fixing portions 2400 matched with the mating rabbets 1300 are arranged in the connecting pieces 2000. When the grip portion 1000 penetrates into the connecting pieces 2000, the grip portion 1000 can be rotated to allow the mating rabbets 1300 to engage with the fixing portions 2400.

Further, clamping holes 2500 are symmetrically formed in the connecting piece 2000 and detachably connected with a fixing piece 2600, and after the mating rabbet 1300 engages with the fixing portion 2400, the fixing piece 2600 is inserted to be disposed around the mating portion 1200. Because the fixing piece 2600 matches the mating portion 1200 in shape and is provided with a limit structure, the mating portion 1200 is non-rotationally arranged in the connecting piece 2000 after the fixing portion 2400 is disposed around the mating portion 1200, such that the connecting rod 1100 and the connecting piece 2000 are connected and fixed together.

In other embodiments (not shown), the fixing piece 2600 and the mating portion 1200 may be square, oval or in other shapes as long as the mating portion 1200 can be non-rotationally arranged in the connecting piece 2000.

Figure 2:
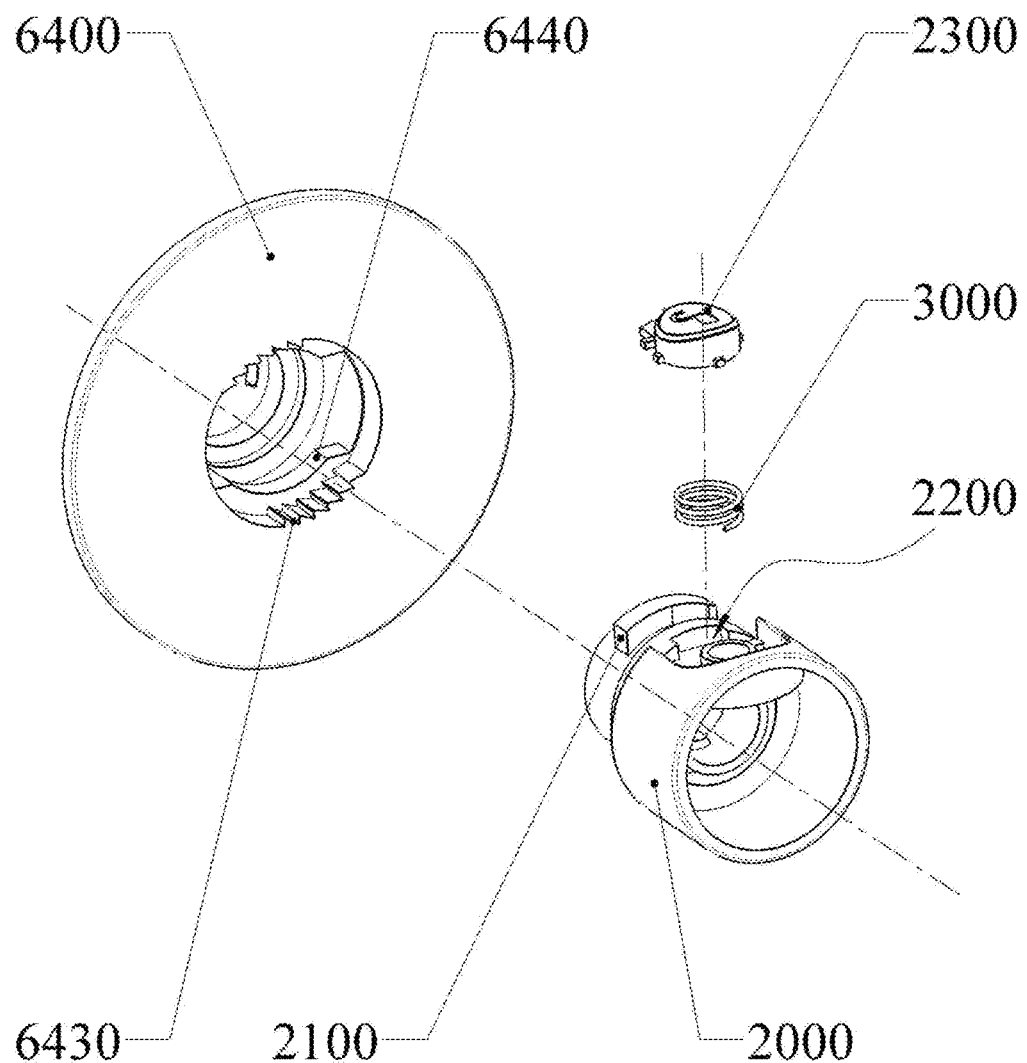
FIG. 2 is an exploded view of the connecting assembly according to the invention.
Figure 3:
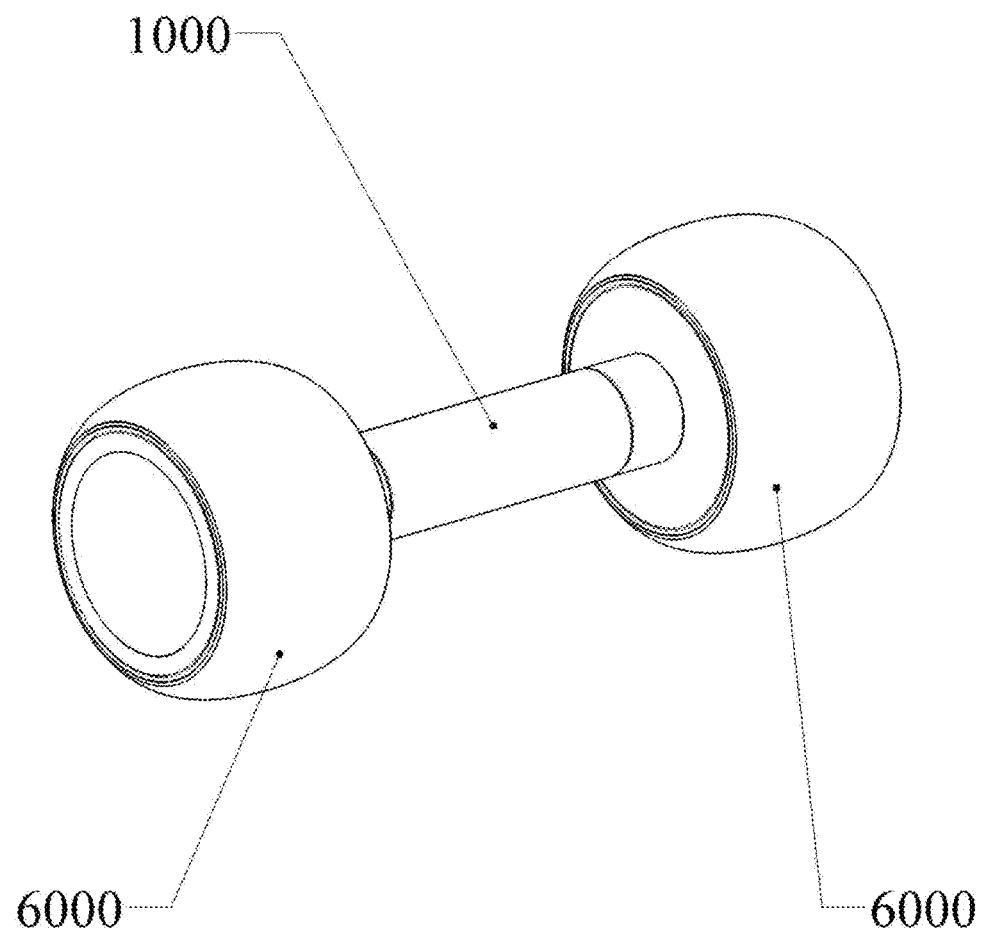
FIG. 3 is a schematic diagram of an exercise device according to the invention.
Figure 4:
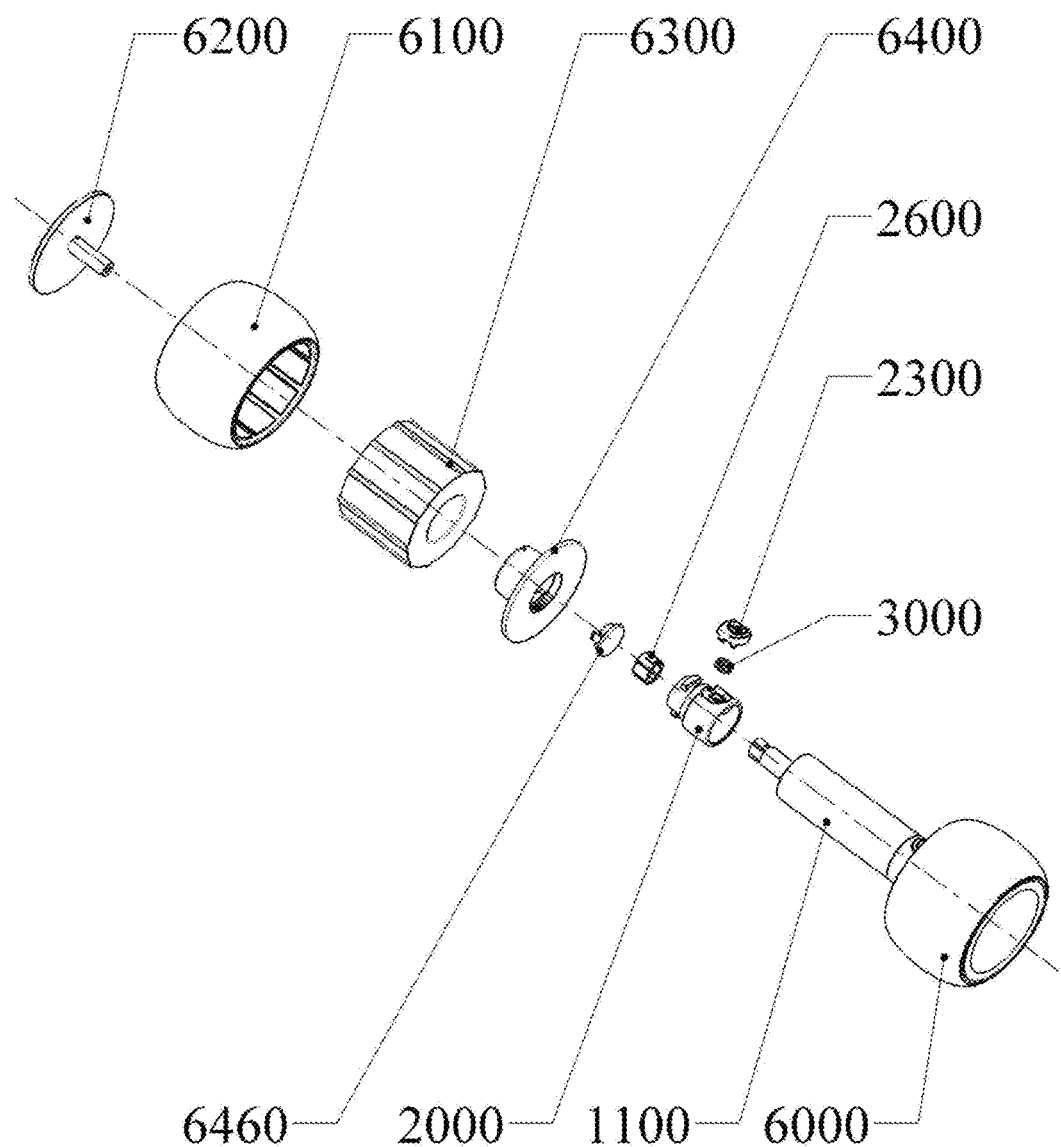
FIG. 4 is an exploded view of the exercise device according to the invention.
Figure 7:
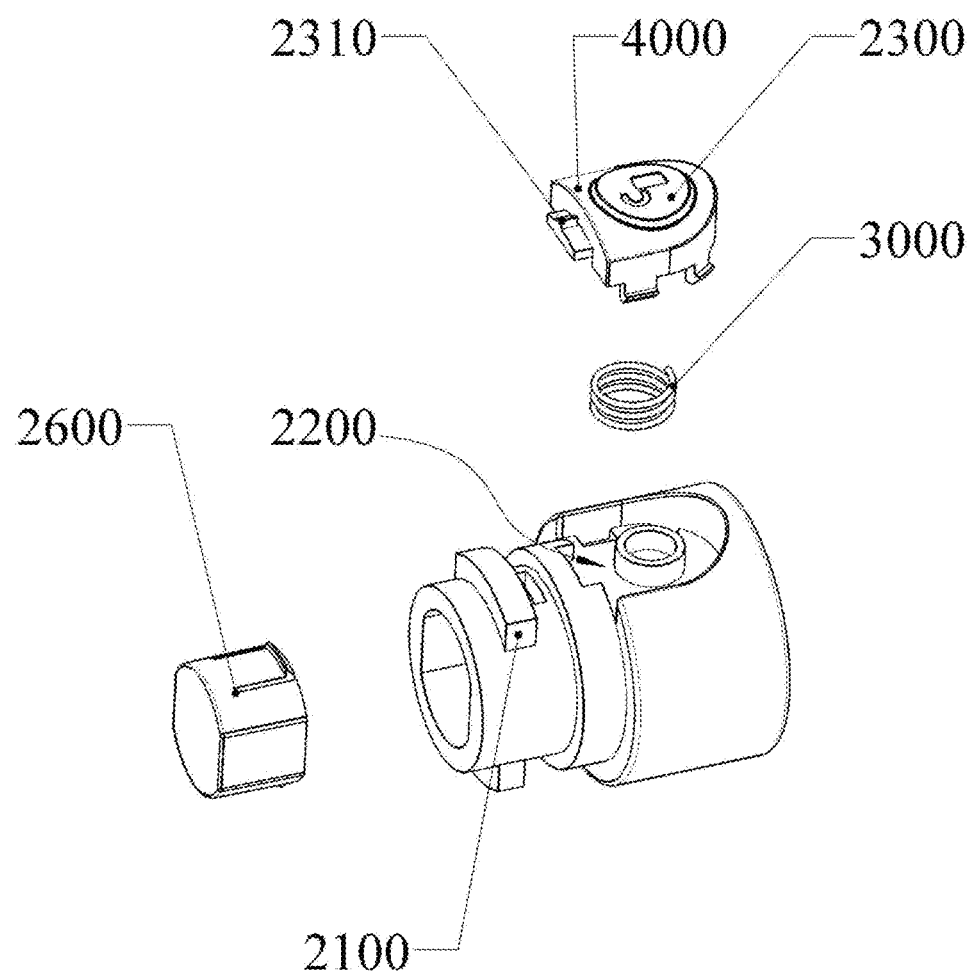
FIG. 7 is an exploded view of the connecting piece according to the invention.

Referring to FIG. 1 and FIG. 2, the connecting piece 2000 is provided with a protruding portion 2100 and a receiving portion 2200, and the protruding portion 2100 and the receiving portion 2200 are fixedly arranged on the connecting piece 2000. A movable tooth button 2300 is arranged in the receiving portion 2200, and an elastic element 3000 is arranged between the movable tooth button 2300 and the receiving portion 2200. In this embodiment, the elastic element 3000 is a spring. In other embodiments, the elastic element 3000 may be sponge, EVA foam or other elastic materials. The movable tooth button 2300 is elastically arranged in the receiving portion 2200 by the elastic element 3000. Referring to FIG. 7, the movable tooth button 2300 comprises a fixing tooth 2310, and the fixing tooth 2310 is fixedly arranged on the movable tooth button 2300.

Further, a button shell 4000 is detachably connected to the movable tooth button 2300, and the elastic element 3000 and the movable tooth button 2300 are fixed in the receiving portion 2200 by the button shell 4000, such that the movable tooth button 2300 is prevented from disengaging from the receiving portion 2200. In this embodiment, the button shell 4000 is clamped on the receiving portion 2200. In other embodiments (not shown), the button shell 4000 may be fixed to the receiving portion 2200 by threaded connection, bonding or in other ways.

Figure 8:
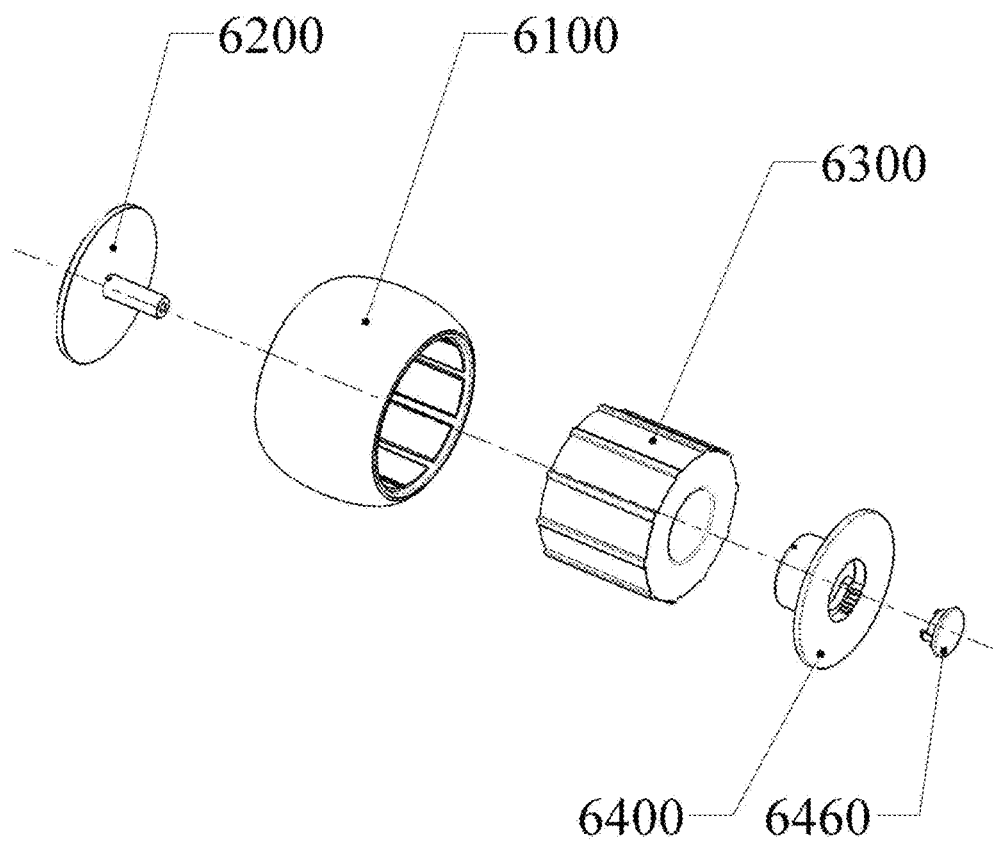
FIG. 8 is an exploded view of a weight according to the invention.
Figure 9:
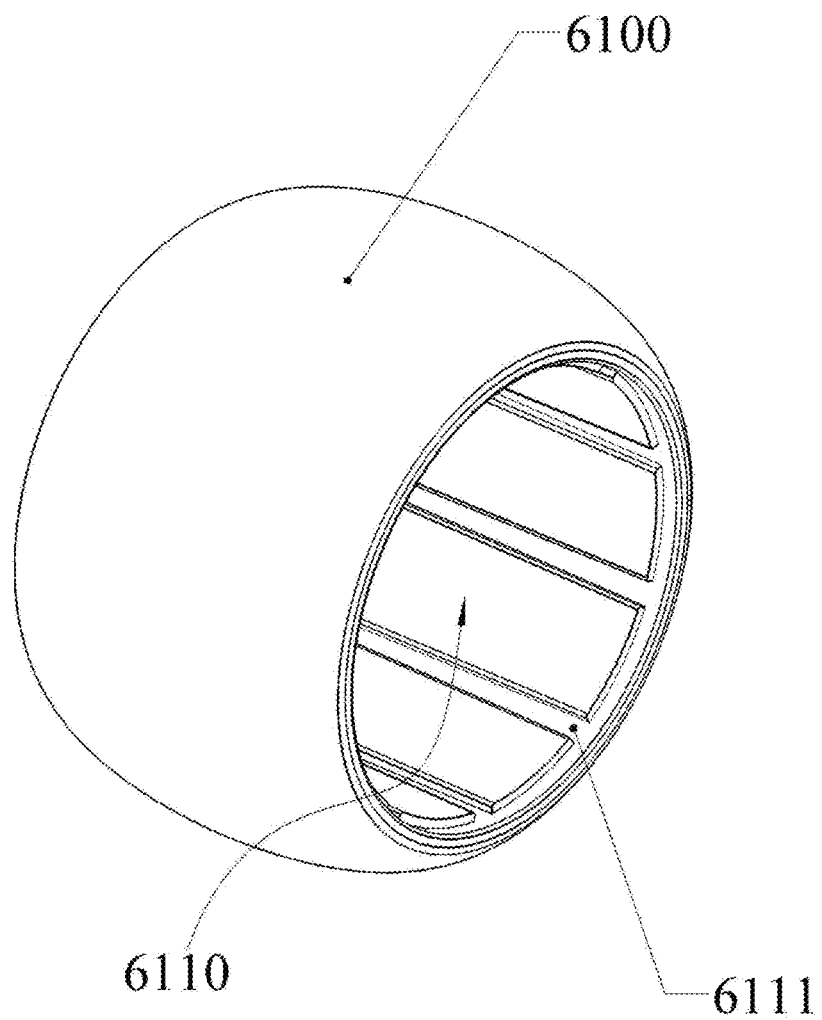
FIG. 9 is a schematic diagram of a shell according to the invention.

Referring to FIG. 8, the weight 6000 comprises a shell 6100, a bottom cover 6200, a weight block 6300 and a locking piece 6400. Referring to FIG. 9, the shell 6100 is provided with a cavity 6110, the bottom cover 6200 and the locking piece 6400 are arranged at two ends of the shell 6100, and the bottom cover 6200 and the locking piece 6400 are threadedly connected to seal the cavity 6110.

Figure 10:
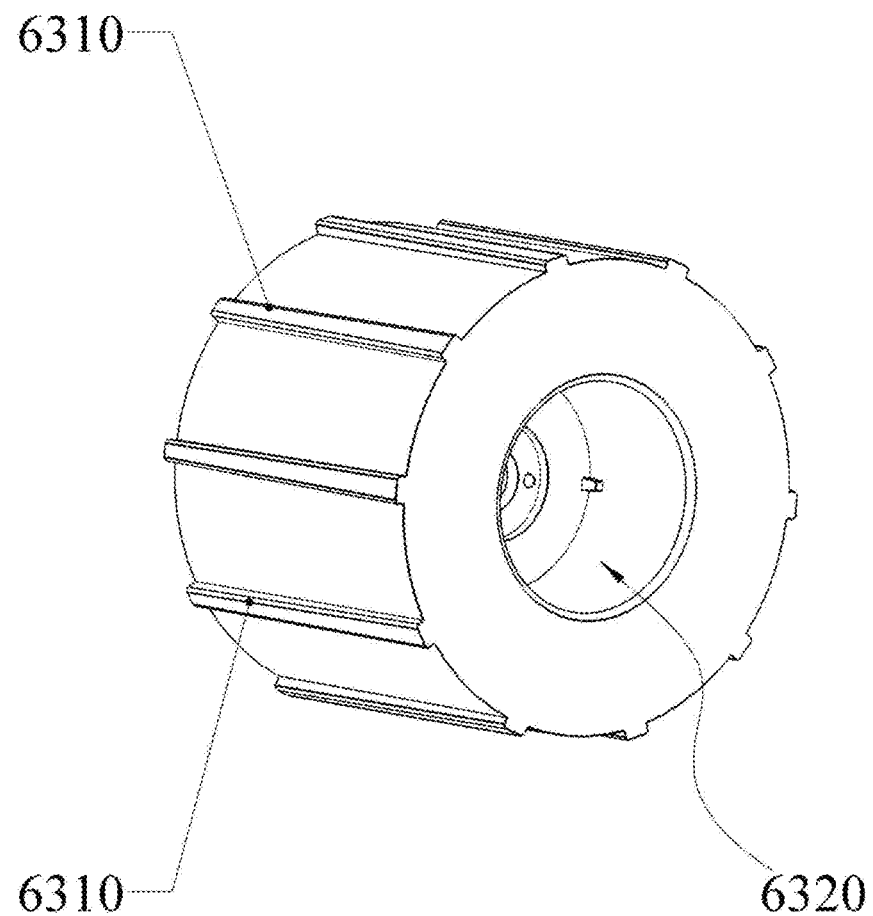
FIG. 10 is a schematic diagram of a weight block according to the invention.

Further, referring to FIG. 8 to FIG. 10, the weight block 6300 is arranged in the cavity 6110, sliding grooves 6111 are formed in an inner wall of the cavity 6110, sliding portions 6310 matched with the sliding grooves 6111 are arranged on an outer surface of the weight block 6300, and the weight block 6300 is detachably and slidably arranged in the cavity 6110 by the sliding grooves 6111 and the sliding portions 6310.

Figure 11:
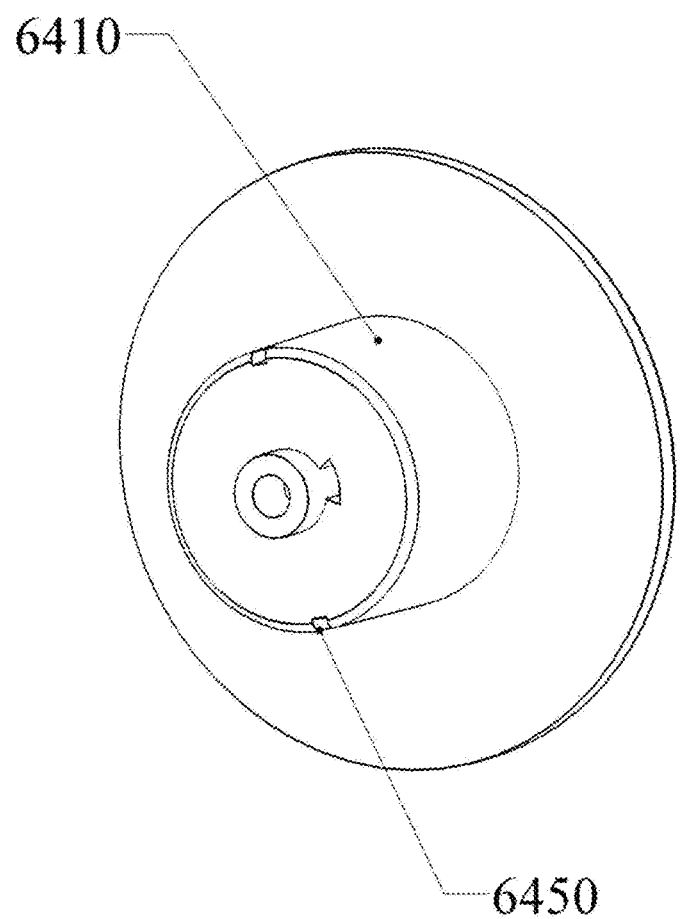
FIG. 11 is a schematic diagram of a locking piece according to the invention.

Referring to FIG. 10 and FIG. 11, the weight block 6300 is provided with a socket 6320, the locking piece 6400 extends outwards to form a connecting portion 6410, and the connecting portion 6410 is inserted into the socket 6320 and detachably connected with the weight block 6300 by a bolt.

Specifically, the bottom cover 6200, the weight block 6300 and the locking piece 6400 are all provided with threaded holes, the bolt penetrates through the threaded holes of the bottom cover 6200, the weight block 6300 and the locking piece 6400 to connect the weight 6000 into a whole.

Figure 12:
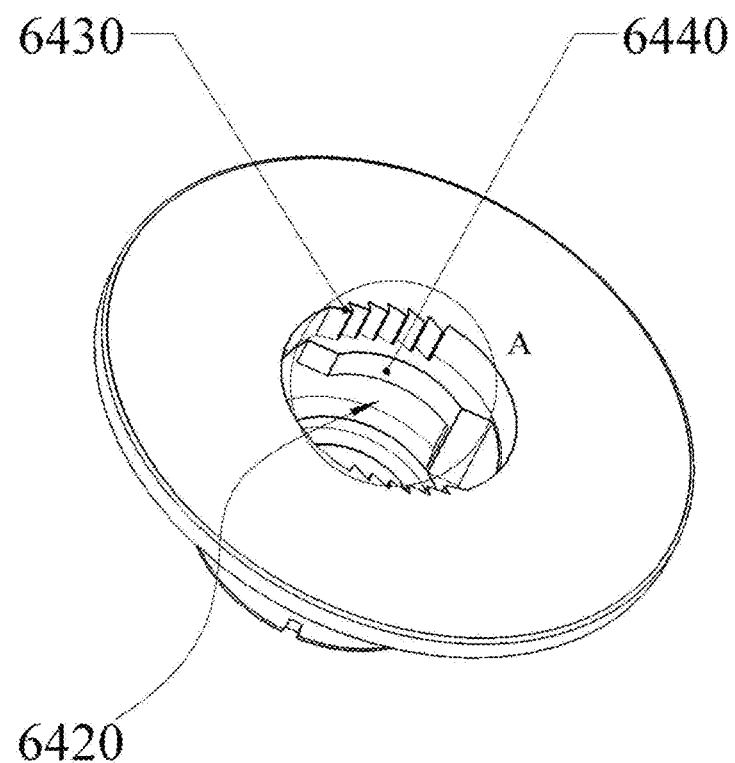
FIG. 12 is a schematic diagram of the locking piece according to the invention.
Figure 13:
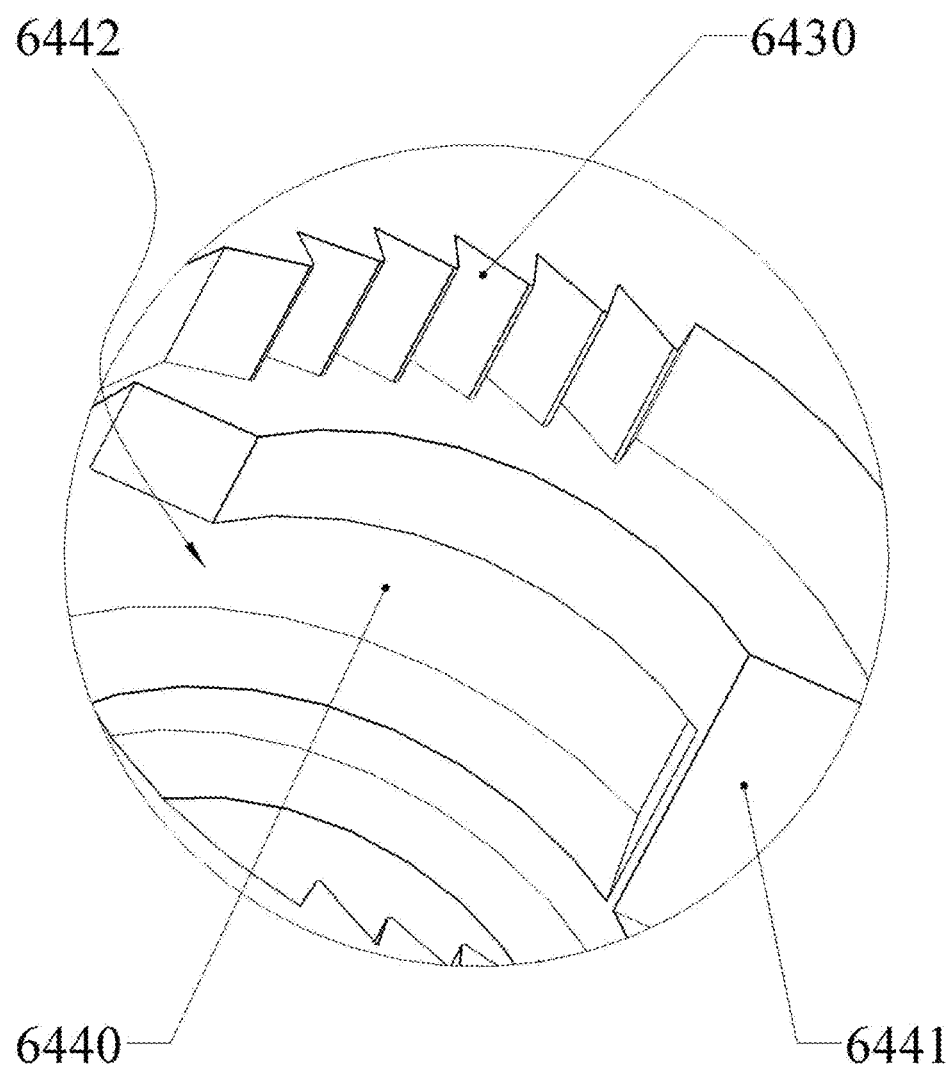
FIG. 13 is an enlarged view of part A in FIG. 12.

Referring to FIG. 11 to FIG. 13, the weight 6000 is provided with a receiving slot 6420, the receiving slot 6420 is arranged in the connecting portion 6410, and the grip portion 1000 is rotatably arranged in the receiving slot 6420. Limit teeth 6430 and a limit groove 6440 are arranged in the receiving slot 6420, and the limit groove 6440 has an open end 6441 and a closed end 6442. When the grip portion 1000 is located in the receiving slot 6420, the protruding portion 2100 is rotatably arranged in the limit groove 6440 via the open end 6441, and the limit teeth 6430 mesh with the fixing tooth 2310.

Further, referring to FIG. 11 to FIG. 13, connecting holes 6450 are symmetrically formed in an outer surface of the connecting portion 6410 and detachably connected with an abutting piece 6460, and the abutting piece 6460 limits the depth of the grip portion 1000 inserted into the receiving slot 6420. That is, when the grip portion 1000 is located in the receiving slot 6420, the abutting piece 6460 will limit the grip portion 1000 to ensure that the grip portion 1000 is inserted into the receiving slot 6420 by a depth allowing the protruding portion 2100 to be exactly located in the limit groove 6440, such that when the grip portion 1000 is rotated, the protruding portion 2100 can enter the limit groove 6440, and the limit teeth 6430 can mesh with the fixing tooth 2310.

Specifically, referring to FIG. 1 to FIG. 13, the movable tooth button 2300 has a convex state and a concave state under the action of the elastic element 3000. When the grip portion 1000 is located in the receiving slot 6420, the movable tooth button 2300 is in the convex state, the grip portion 1000 can be rotated to allow the limit teeth 6430 to mesh with the fixing tooth 2310, and at this moment, the protruding portion 2100 enters the limit groove 6440 via the open end 6441. Because the limit teeth 6430 are provided with bulges, the fixing tooth 2310 is only allowed to rotate in one direction, and the protruding portion 2100 is driven to rotate towards the closed end 6442. When coming in contact with the closed end 6442, the protruding portion 2100 will be limited by the closed end 6442 to be prevented from further rotating, such that the grip portion 1000 cannot rotate anymore. Under the action of the limit teeth 6430, the grip portion 100 cannot rotate in the opposite direction either, thus being fixed in the receiving slot 6420.

In the concave state, the movable tooth button 2300 can be pressed to allow the fixing tooth 2310 to be separated from the limit teeth 6430, at this moment, the grip portion 1000 can rotate in the opposite direction, that is, the protruding portion 2100 can rotate towards the open end 6441. When the protruding portion 2100 leaves the limit groove 6440, the grip portion 1000 can be taken out from the receiving slot 6420, such that the weight 6000 and the grip portion 1000 are disassembled.

Figure 14:
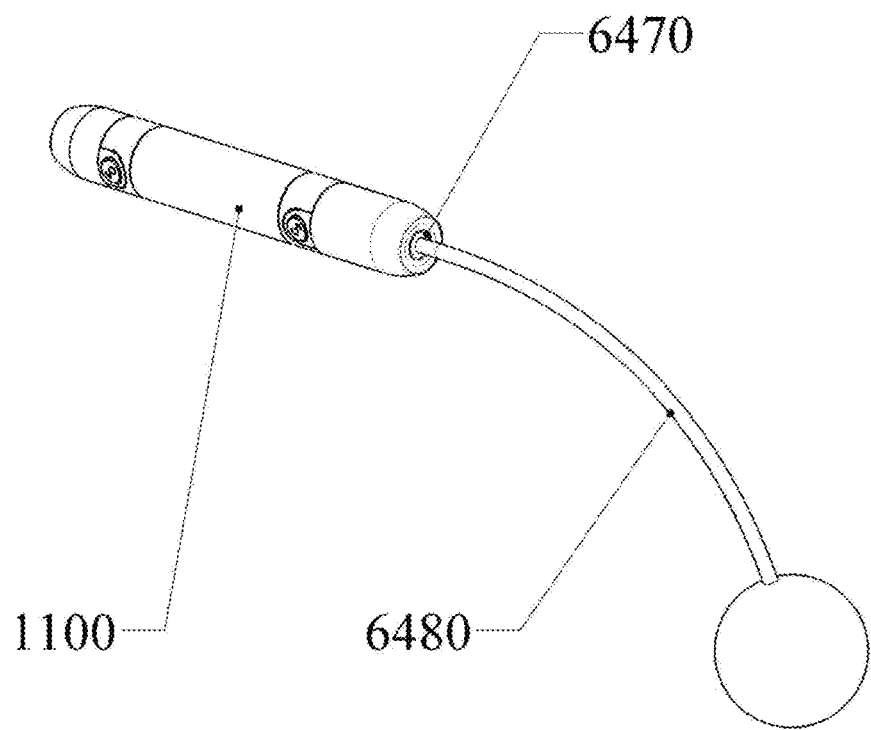
FIG. 14 is a schematic diagram of the exercise device according to another embodiment of the invention.

Referring to FIG. 14, in some embodiments, one end of the locking piece 6400 is closed, a through-hole 6470 is formed in the other end of the locking piece 6400 and penetrates through the locking piece 6400, and the locking piece 6400 is connected with a rope 6480 by the through-hole 6470, wherein, one end of the rope 6480 is connected with the locking piece 6400, and the other end of the rope 6480 is connected with the weight 6000. In this case, the exercise device functions as a ropeless jump rope.

Figure 15:
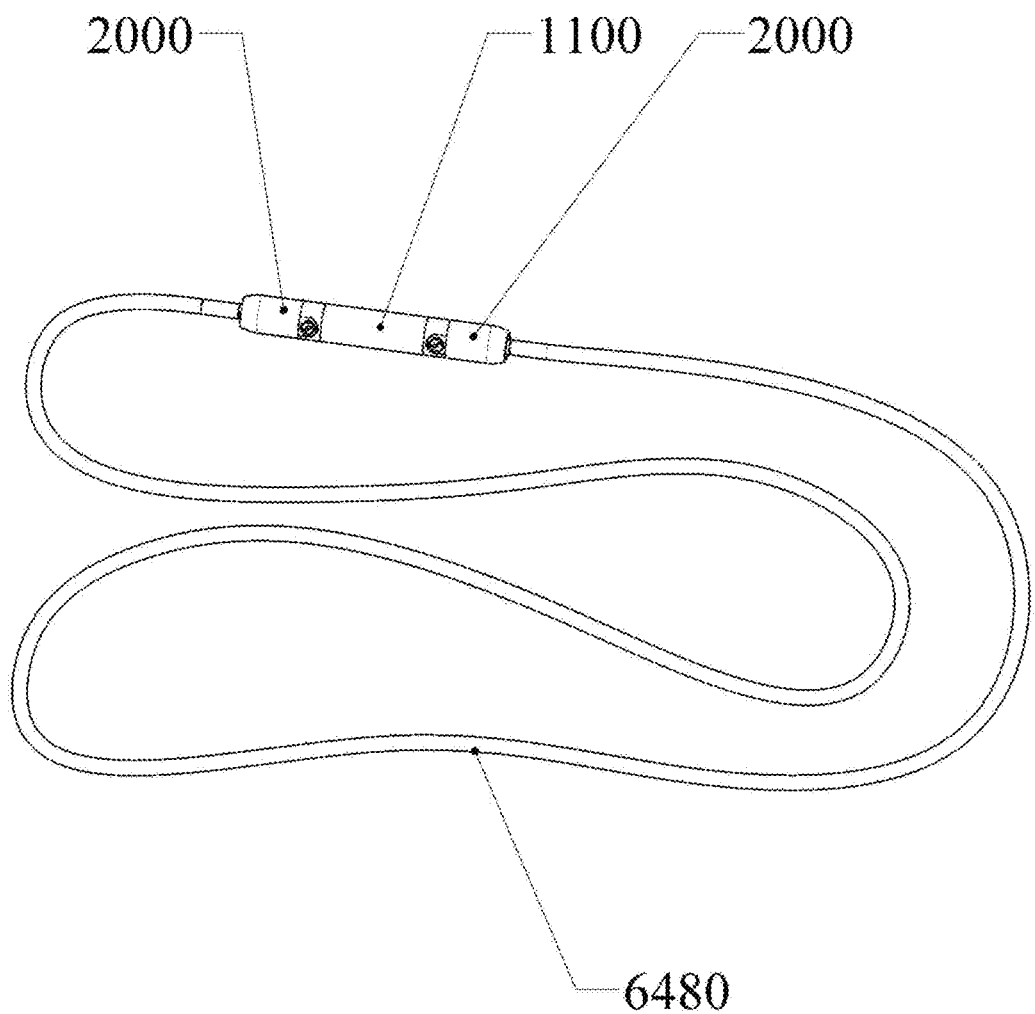
FIG. 15 is a schematic diagram of the exercise device according to another embodiment of the invention.
Figure 16:
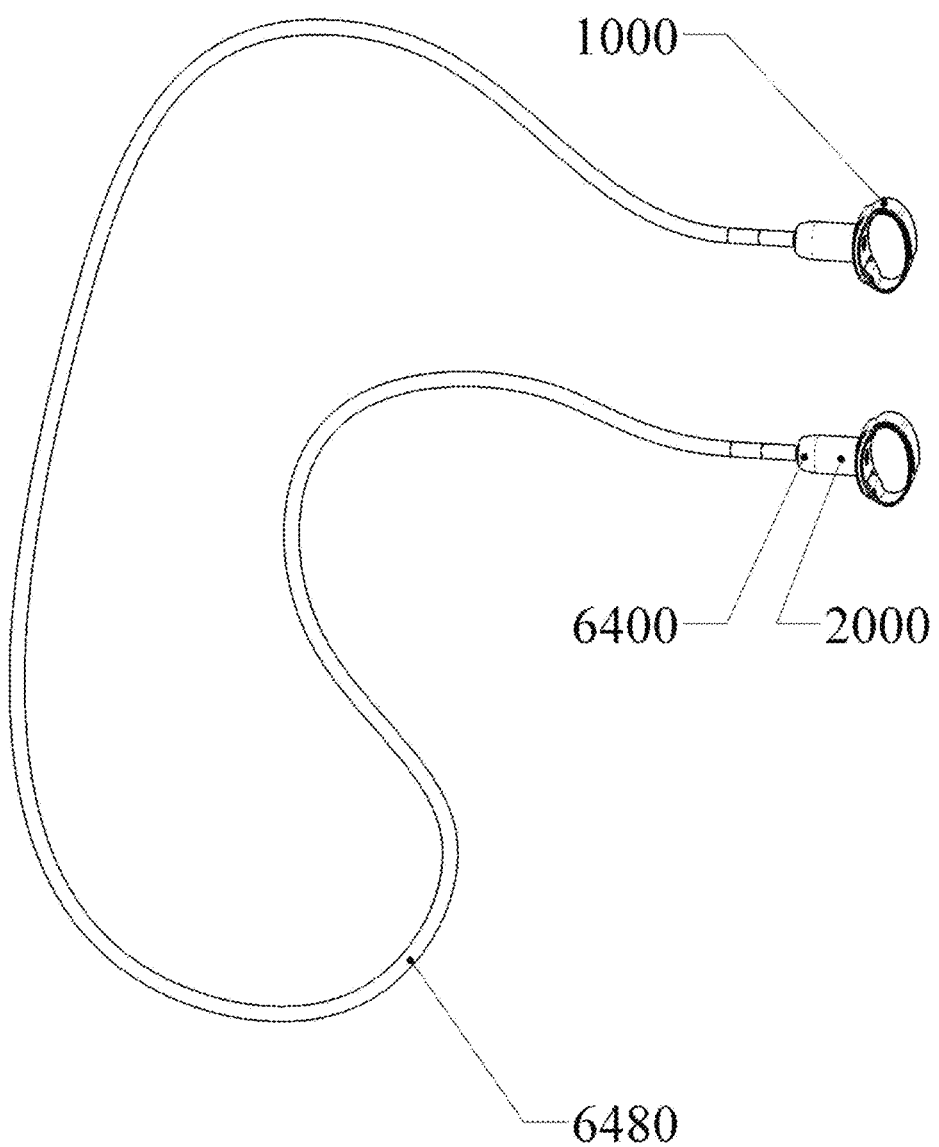
FIG. 16 is a schematic diagram of the exercise device according to another embodiment of the invention.

Referring to FIG. 15 and FIG. 16, in other embodiments, through-holes 6470 are formed in two ends of the locking piece 6400 and penetrate through the locking piece 6400, and the locking piece 6400 is connected with a rope 6480 by the through-holes 6470. In this case, the exercise device functions as a traditional jump rope or elastic string.

Figure 17:
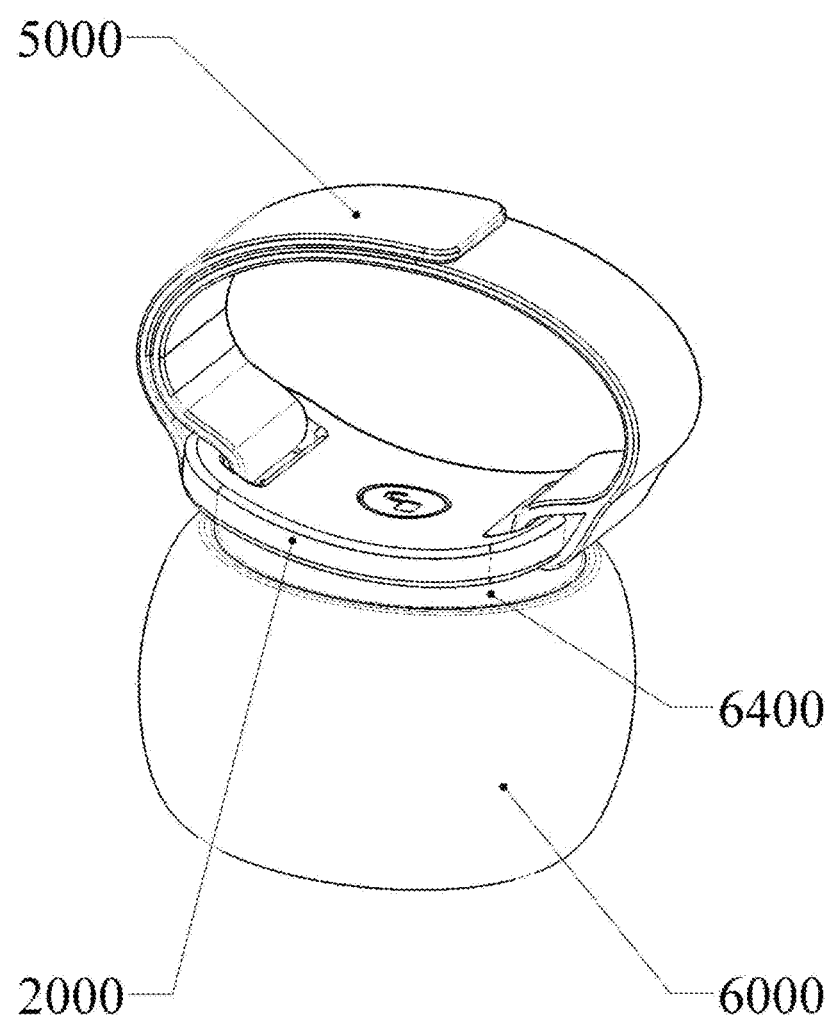
FIG. 17 is a schematic diagram of the exercise device according to another embodiment of the invention.

Referring to FIG. 17, in another embodiment, the grip portion 1000 provided with a mating portion 1200, the grip portion 1000 is connected with one connecting piece 2000 by the mating portion 1200, and the mating portion 1200 is fixedly connected with the connecting piece 2000. In this case, the exercise device functions as a kettlebell with only one weight 6000.

Figure 18:
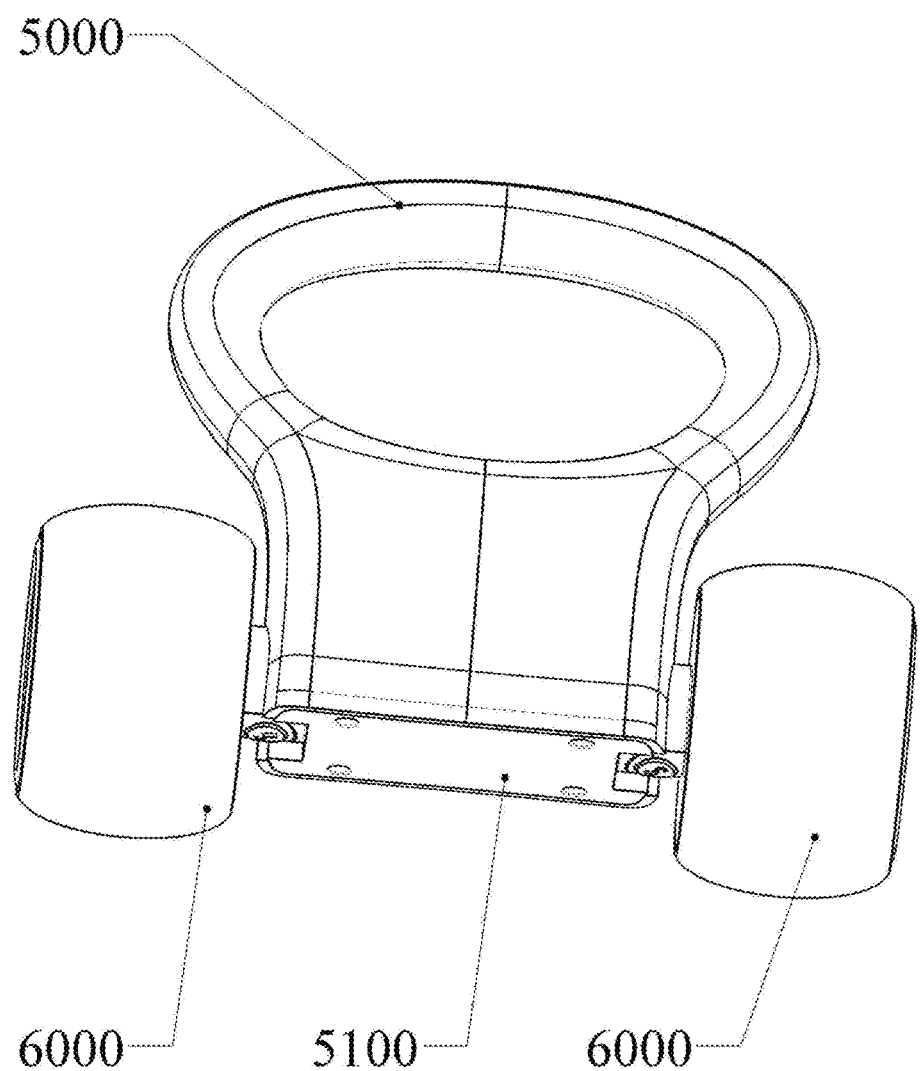
FIG. 18 is a schematic diagram of the exercise device according to another embodiment of the invention.

Referring to FIG. 18, in another embodiment, the grip portion 1000 is provided with a connecting rod 1100, the connecting piece 2000 is configured as a hollow structure, two connecting pieces 2000 are detachably disposed around two ends of the connecting rod 1100, and the grip portion 1000 is provided with a lifting portion 5000 and a fixing plate 5100, the connecting rod 1100 is arranged between the lifting portion 5000 and the fixing plate 5100, and the lifting portion 5000 and the fixing plate 5100 are connected and fixed by bolts. In this case, the exercise device functions as a kettlebell with weights 6000 at both ends.

In another embodiment (not shown), the method for detaching and changing weights can be applied to various exercise devices requiring weight or resistance adjustment, such as barbells and comprehensive training equipment, or resistance training devices such as rowing machines and elliptical machines (users can adjust the weights to change the training resistance), or rehabilitation training devices such as rehabilitation training machines and rehabilitation training aids (doctors or therapists can adjust the weights according to the rehabilitation condition of patients to obtain training strength suitable for the patients), or other exercise devices.

Figure 19:
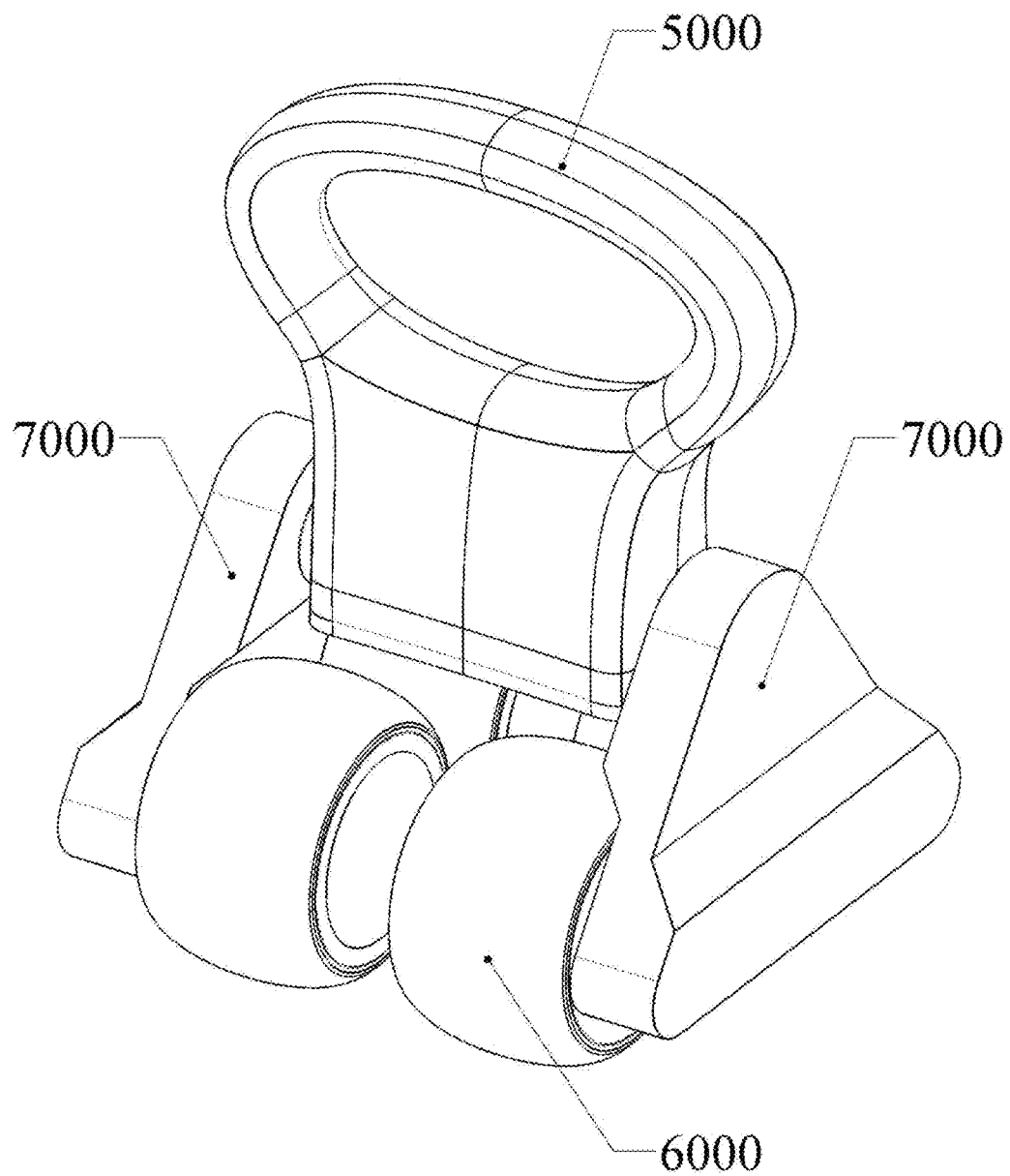
FIG. 19 is a schematic diagram of the exercise device according to another embodiment of the invention.
Figure 20:
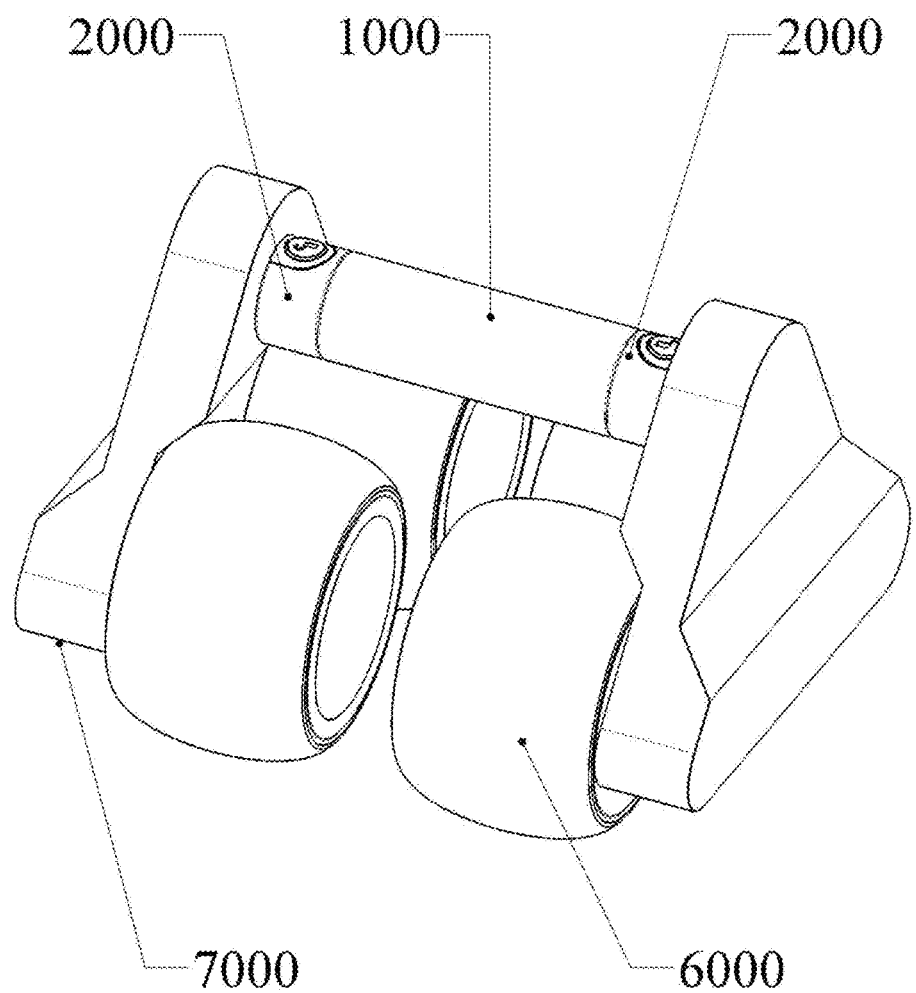
FIG. 20 is a schematic diagram of the exercise device according to another embodiment of the invention.
Figure 21:
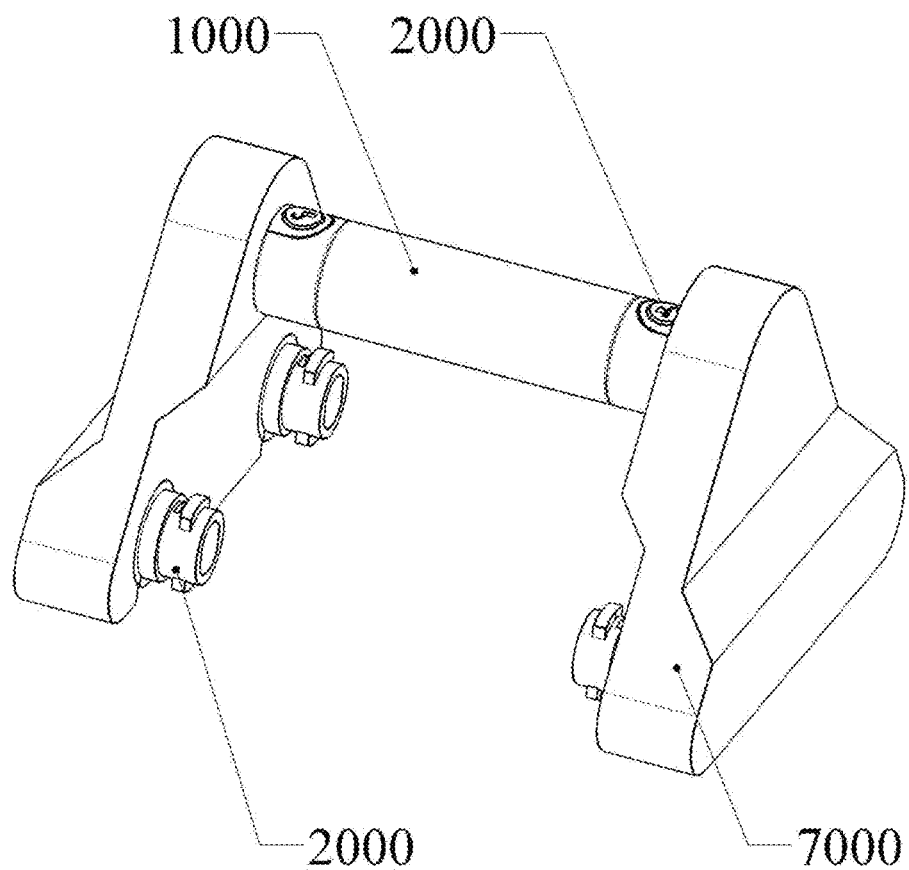
FIG. 21 is a schematic diagram of the exercise device according to another embodiment of the invention.

In some embodiments, referring to FIG. 19 and FIG. 21, the exercise device further comprises support members 7000. Specifically, structures similar to the receiving slot 6420 are arranged on upper portions of the support members 7000, such that the support members 7000 can be arranged at two ends of the mating portions 1200 by the connecting pieces 2000. Moreover, mating portions 1200 are arranged on lower portions of the support members 7000, and multiple connecting pieces 2000 are arranged on each of the mating portions 1200. Multiple weights 6000 may be connected to the lower portion of the support member 7000 by the connecting pieces 2000. In this way, users can add the weights 6000 to the exercise device according to personal requirements (as shown in FIG. 19 and FIG. 20).

In another embodiment, referring to FIG. 21, no weight 6000 is arranged on the lower portions of the support members 7000. In this case, the support members 7000 may be in contact with the ground and can be used by users as push-up stands.

As another preferred embodiment of the invention, the invention further provides a body-building method, using an easy-to-adjust exercise device.

The body building method comprises: a suitable weight 6000 is selected according to exercise requirements of a user; then, a grip portion 1000 is placed in a receiving slot 6420 of the weight 6000; next, the grip portion 1000 is rotated to engage a movable tooth button 2300 and a protruding portion 2100 with limit teeth 6430 and a limit groove 6440 respectively to fix the grip portion 1000 in the receiving slot 6420; and after the grip portion 1000 is fixed, the user can use the exercise device to do exercise.

When the weight 6000 needs to be changed, the movable tooth button 2300 is pressed to separate the fixing tooth 2310 from the limit teeth 6430. Then, the grip portion 1000 is rotated towards the open end 6441 to leave the limit groove 6440. After the grip portion 1000 leaves the limit groove 6440, users can detach the weight 6000 from the grip portion 1000.

The easy-to-adjust exercise device provided by the invention has the following advantages: exercise device easy to adjust: by the design of the movable tooth button 2300 and the elastic element 3000, users can change the weight 6000 more easily to adjust the exercise strength; high safety: when rotating to the closed end 6442, the protruding portion 2100 will be limited by the closed end 6442 to be prevented from further rotating, and the limit teeth 6430 will prevent the grip portion 1000 from rotating in the opposite direction, thus preventing accidental falling of the weight and ensuring the safety of users; convenient to use: in the concave state, the fixing tooth 2310 can be separated from the limit teeth 6430, and the protruding portion 2100 can rotate towards the open end 6441 to leave the limit groove 6440, such that the weight 6000 can be changed conveniently; high adaptivity: because the position of the weight 6000 can be adjusted easily, the exercise device can satisfy different exercise requirements and adapt to different users.

In a broad sense of the invention, the easy-to-adjust and easy-to-change structural design can be applied to multiple fields including, but not limited to, medical equipment, furniture design, mechanical industry and transportation facilities, wherein the field of medical equipment, the design can be applied to artificial limbs and orthotics, for example, the length and angle of the artificial limbs can be adjusted by a similar mechanism to adapt to the physical condition of users and satisfy movement requirements of users, and the orthotics can also be adjusted to change its adaptivity to body parts to provide better comfort and functions; in furniture design, the design can be applied to adjustable chairs or desks, for example, the height and inclination angle of the chairs can be adjusted by a similar mechanism to adapt to the height and sitting habit of users, and similarly, the height and angle of the desks can also be adjusted to provide a more comfortable working or study environment; in the mechanical industry, the design can be applied to adjustable gears and belts, for example, the size and position of the gears can be adjusted by a similar mechanism to change the operating speed and power of machines; and in transportation facilities, the design can be applied to adjustable bike saddles and cart seats, for example, the height and angle of the saddles/seats can be adjusted by a similar mechanism to adapt to the height and driving habit of users.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense)

so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for case of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. An easy-to-adjust connecting assembly, comprising a locking piece and a connecting piece, wherein:
    the connecting piece is provided with a protruding portion and a receiving portion, a movable tooth button is arranged in the receiving portion, an elastic element is arranged between the movable tooth button and the receiving portion, and the movable tooth button is elastically arranged in the receiving portion by the elastic element and comprises a fixing tooth; and
    the locking piece is provided with a receiving slot, the connecting piece is rotatably arranged in the receiving slot, limit teeth and a limit groove are arranged in the receiving slot, the limit groove has an open end and a closed end, the limit teeth are able to mesh with the fixing tooth, and the protruding portion is rotatably arranged in the limit groove via the open end; and
    wherein, the movable tooth button has a convex state and a concave state under an action of the elastic element; and in the convex state, the limit teeth is mesh with the fixing tooth, the protruding portion is located in the limit groove and is only allowed to rotate towards the closed end, and when rotating to the closed end, the protruding portion is limited by the closed end to be prevented from further rotating; and
    in the concave state, the fixing tooth is separated from the limit teeth, and the protruding portion is allowed to rotate towards the open end to leave the limit groove.

2. The easy-to-adjust connecting assembly according to claim 1, wherein the connecting piece is connected with a connecting rod and is configured as a hollow structure, and the connecting piece is detachably disposed around two ends of the connecting rod respectively.

3. The easy-to-adjust connecting assembly according to claim 2, wherein a button shell is detachably connected to the movable tooth button, the elastic element and the movable tooth button are fixed in the receiving portion by the button shell, and the button shell is clamped on the receiving portion.

4. The easy-to-adjust connecting assembly according to claim 3, wherein through-holes are formed in two ends of the locking piece and penetrate through the locking piece, and the locking piece is connected with a rope by the through-holes.

5. The easy-to-adjust connecting assembly according to claim 3, wherein one end of the locking piece is closed, a through-hole is formed in other end of the locking piece and penetrates through the locking piece, and the locking piece is connected with a rope by the through-hole.

6. An easy-to-adjust exercise device, comprising a weight and a grip portion, wherein:
    the grip portion is connected with a connecting piece, the connecting piece is provided with a protruding portion and a receiving portion, a movable tooth button is arranged in the receiving portion, an elastic element is arranged between the movable tooth button and the receiving portion, and the movable tooth button is elastically arranged in the receiving portion by the elastic element and comprises a fixing tooth; and
    the weight is provided with a receiving slot, the grip portion is rotatably arranged in the receiving slot, limit teeth and a limit groove are arranged in the receiving slot, the limit groove has an open end and a closed end, the limit teeth are able to mesh with the fixing tooth, and the protruding portion is rotatably arranged in the limit groove via the open end; and
    wherein, the movable tooth button has a convex state and a concave state under an action of the elastic element; and in the convex state, the limit teeth is mesh with the fixing tooth, the protruding portion is located in the limit groove and is only allowed to rotate towards the closed end, and when rotating to the closed end, the protruding portion is limited by the closed end to be prevented from further rotating; and
    in the concave state, the fixing tooth is separated from the limit teeth, and the protruding portion is allowed to rotate towards the open end to leave the limit groove.

7. The easy-to-adjust exercise device according to claim 6, wherein the grip portion is provided with a connecting rod, the connecting piece is configured as a hollow structure, and two connecting pieces are detachably disposed around two ends of the connecting rod respectively.

8. The easy-to-adjust exercise device according to claim 7, wherein mating portions are arranged on the connecting rod, mating rabbets are fixedly arranged on the mating portions, fixing portions are arranged in the connecting pieces, and the connecting rod is rotated to allow the mating rabbets to engage with the fixing portions.

9. The easy-to-adjust exercise device according to claim 8, further comprising support members, upper portions of the support members are arranged at two ends of the grip portion by the connecting pieces, and multiple weights are detachably connected to lower portions of the support members by the connecting pieces to expand the exercise device.

10. The easy-to-adjust exercise device according to claim 7, wherein the grip portion is provided with a lifting portion and a fixing plate, the connecting rod is arranged between the lifting portion and the fixing plate, and the lifting portion and the fixing plate are connected and locked by a bolt.

11. The easy-to-adjust exercise device according to claim 6, wherein the grip portion is provided with a mating portion and connected with one said connecting piece by the mating portion, and the mating portion is fixedly connected with the connecting piece.

12. The easy-to-adjust exercise device according to claim 11, wherein clamping holes are symmetrically formed in the connecting piece and detachably connected with a fixing piece, the fixing piece is clamped in the clamping holes, and at least part of the mating portion is inserted into the fixing piece.

13. The easy-to-adjust exercise device according to claim 12, wherein the fixing piece matches the mating portion in shape, and when the fixing portion engages with a mating rabbet, the fixing piece is clamped in the clamping holes, such that the mating portion is non-rotationally arranged in the connecting piece.

14. The easy-to-adjust exercise device according to claim 13, wherein a button shell is detachably connected with the movable tooth button, the elastic element and the movable tooth button are fixed in the receiving portion by the button shell, and the button shell is clamped on the receiving portion.

15. The easy-to-adjust exercise device according to claim 6, wherein the weight is provided with a shell, the shell is provided with a cavity, and a bottom cover and a locking piece are arranged at two ends of the shell and are threadedly connected to seal the cavity.

16. The easy-to-adjust exercise device according to claim 15, wherein a weight block is arranged in the cavity, sliding grooves are formed in an inner wall of the cavity, sliding portions matched with the sliding grooves are arranged on an outer surface of a weight block, and the weight block is detachably arranged in the cavity by the sliding grooves and the sliding portions.

17. The easy-to-adjust exercise device according to claim 16, wherein the weight block is provided with a socket, the locking piece extends outwards to form a connecting portion, and the connecting portion is inserted into the socket and detachably connected with the weight block by a bolt.

18. The easy-to-adjust exercise device according to claim 17, wherein the receiving slot is formed in the connecting portion, connecting holes are symmetrically formed in an outer surface of the connecting portion and detachably connected with an abutting piece, and the abutting piece limits a depth of the grip portion inserted into the receiving slot.

19. A body-building method, using an easy-to-adjust exercise device, the easy-to-adjust exercise device comprising multiple weights and a grip portion, wherein:
the grip portion is provided with connecting pieces, each connecting piece is provided with a protruding portion and a receiving portion, a movable tooth button is arranged in the receiving portion, an elastic element is arranged between the movable tooth button and the receiving portion, and the movable tooth button is elastically arranged in the receiving portion by the elastic element and comprises a fixing tooth; and
each weight of the multiple weights is provided with a receiving slot, the grip portion is rotatably arranged in the receiving slot, limit teeth and a limit groove are arranged in the receiving slot, the limit groove has an open end and a closed end, the limit teeth are able to mesh with the fixing tooth, and the protruding portion is rotatably arranged in the limit groove via the open end; and
wherein, the movable tooth button has a convex state and a concave state under an action of the elastic element; and in the convex state, the limit teeth is mesh with the fixing tooth, the protruding portion is located in the limit groove and is only allowed to rotate towards the closed end, and when rotating to the closed end, the protruding portion is limited by the closed end to be prevented from further rotating; and
in the concave state, the fixing tooth is separated from the limit teeth, and the protruding portion is allowed to rotate towards the open end to leave the limit groove; and
the body-building method comprises:
selecting suitable weights, and placing the grip portion in the receiving slot; and
rotating the grip portion to allow the movable tooth button and the protruding portion to engage with the limit teeth and limit groove respectively to fix the grip portion in the receiving slot; and
doing exercise with the easy-to-adjust exercise device.

20. The body-building method according to claim 19, wherein after being placed in the receiving slot, the grip portion is rotated to allow the protruding portion to rotate towards the open end to enter the limit groove via the open end and then to rotate towards the closed end; and after exercising, the movable tooth button is pressed to separate the fixing tooth from the limit teeth, and then the grip portion is rotated towards the open end to leave the limit groove, such that the weights and the grip portion are disassembled.

* * * * *